United States Patent Office 3,776,923
Patented Dec. 4, 1973

3,776,923
2-NITRO-4-OXO-4,5,6,7-TETRAHYDROINDOLE
William Alan Remers, West Lafayete, Ind., and Martin Joseph Weiss, Oradell, N.J., assignors to American Cyanamid Company, Stamford, Conn.
No Drawing. Original application Jan. 6, 1970, Ser. No. 1,043, now Patent No. 3,654,303. Divided and this application Jan. 4, 1972, Ser. No. 215,434
Int. Cl. C07d 27/56
U.S. Cl. 260—326.16        1 Claim

ABSTRACT OF THE DISCLOSURE

This disclosure describes compounds of the class of 2-substituted-4-oxo-4,5,6,7-tetrahydroindoles useful as anti-inflammatory agents and as intermediates.

CROSS REFERENCE TO RELATED APPLICATION

This application is a division of our copending application Ser. No. 1,043, filed Jan. 6, 1970, now U.S. Pat. No. 3,654,303, issued Apr. 4, 1972.

BRIEF SUMMARY OF THE INVENTION

This invention relates to new organic compounds and, more particularly, is concerned with novel 2-substituted-4,5,6,7-tetrahydroindoles and with methods of preparing these compounds. The novel compounds of the present invention may be represented by the following general formula:

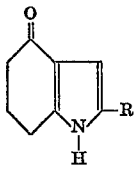

wherein R is nitro or lower alkanoyl. Suitable lower alkanoyl groups contemplated by the present invention are those having from two to four carbon atoms such as, for example, acetyl, propionyl, butyryl, isobutyryl, etc.

DETAILED DESCRIPTION OF THE INVENTION

The 2-nitro-4-oxo-4,5,6,7-tetrahydroindole is useful as an intermediate for the preparation of 5-bromo-2-nitro-4-oxo-4,5,6,7-tetrahydroindole which possesses antifungal activity as is set forth in greater detail in our copending application Ser. No. 1,043, filed Jan. 6, 1970.

The 2-(lower alkanoyl)-4-oxo-4,5,6,7-tetrahydroindoles are generally obtainable as white to pale yellow crystalline materials having characteristic melting points and absorption spectra and which may be purified by recrystallization from water or lower alkanols or mixtures thereof. They are appreciably soluble in many organic solvents such as acetone, chloroform, dimethylformamide, and the like but are sparingly soluble in water.

The 2-(lower alkanoyl)-4-oxo-4,5,6,7-tetrahydroindoles may be readily prepared from 4-oxo-4,5,6,7-tetrahydroindole by treatment with a lower alkanoic anhydride in the presence of 70% perchloric acid. The reaction is best carried out in an excess of the lower alkanoic anhydride as solvent at a temperature of 0°–10° C. for a period of time of about 15 minutes to about half an hour. The reaction mixture is then warmed up to room temperature and poured into water whereupon the corresponding 2-lower alkanoyl derivative of 4-oxo-4,5,6,7-tetrahydroindole separates from the solution.

The 2-(lower alkanoyl)-4-oxo-4,5,6,7-tetrahydroindoles possess anti-inflammatory properties as determined by the carrageenin-induced rat paw edema test as follows.

In this test weanling Sherman strain rats ranging in weight from 50–55 grams are used and fed standard laboratory diet ad libitum. The test compound is administered to the rats by gavage (250 milligrams per kilogram in a volume of 1.7 milliliters of buffered aqueous starch) one hour prior to challenge with carrageenin. The challenge agent, carrageenin, is obtained from Marine Colloids, 2 Edison Place, Springfield, N.J. and prepared as a sterile 1% suspension in 0.09% aqueous sodium chloride. A volume of 0.05 milliliter is injected using a 26-gauge needle into the plantar tissue of the right hind paw of treated and untreated rats. Measurements of the volumes of the carrageenin inflammed right (challenged) paw and left (unchallenged) paw are determined 4 hours subsequent to the carrageenin challenge. The method of determining paw volumes is carried out essentially as described by C. A. Winter et al., in Proc. Soc. Exptl. Biol. Med. 111: 544–547 (1962) using mercury immersion. The differences in volume between the two paws of each rat is considered to be the volume of the carrageenin induced edema. The mean edema volume of eight control rats divided by the mean edema volume of two treated rats is calculated and designated the C/T efficacy ratio. A compound is considered active in this test if the mean C/T efficacy ratio of 2 consecutive tests is equal to or greater than 1.43. In a representative operation, and merely by way of illustration, the means C/T efficacy ratio (four rats) of 2-acetyl-4-oxo-4,5,6,7-tetrahydroindole in the above-described test was 2.14.

This invention will be described in greater detail in conjunction with the following specific examples.

Example 1.—Preparation of 2-nitro-4-oxo-4,5,6,7-tetrahydroindole

A mixture of 540 mg. of 4-oxo-4,5,6,7-tetrahydroindole and 3 ml. of concentrated sulfuric acid is cooled in an ice-salt bath and treated portionwise with a solution of 340 mg. of sodium nitrate in 3 ml. of concentrated sulfuric acid. The mixture is stirred for 10 minutes more and poured onto ice whereupon the product separates as tan crystals. Recrystallization from methanol-water gives tan needles, M.P. 271–272° C. (decomposition).

Example 2.—Preparation of 2-acetyl-4-oxo-4,5,6,7-tetrahydroindole

A suspension of 405 mg. of 4-oxo-4,5,6,7-tetrahydroindole [Ann. Chem. 655, 20 (1962)] in 10 ml. of acetic anhydride is treated with 0.43 ml. of 70% perchloric acid. The resulting orange solution is cooled in an ice bath, whereupon orange crystals form. These crystals are washed with acetic anhydride and with ether. They are then dissolved in water. Yellow crystals of product rapidly separate from this solution. Recrystallization from hot water gives yellow crystals, melting point 185°–188° C.

Example 3.—Preparation of 2-propionyl-4-oxo-4,5,6,7-tetrahydroindole

Following the general procedure of Example 2, 4-oxo-4,5,6,7-tetrahydroindole is treated with propionic anhydride in the presence of 70% perchloric acid to give the 2-propionyl-4-oxo-4,5,6,7-tetrahydroindole.

We claim:
1. 2-nitro-4-oxo-4,5,6,7-tetrahydroindole.

References Cited

Kost et al.: Chem. Abs., vol. 66, 115537k (1967).

JOSEPH A. NARCAVAGE, Primary Examiner